(12) United States Patent
Neergaard

(10) Patent No.: US 10,723,004 B1
(45) Date of Patent: Jul. 28, 2020

(54) PIN TOOL MEMBER AND CLIP INSTALLATION SYSTEM INCLUDING THE SAME

(71) Applicant: Arthur Hampton Neergaard, Cincinnati, OH (US)

(72) Inventor: Arthur Hampton Neergaard, Cincinnati, OH (US)

(*) Notice: Subject to any disclaimer, the term of this patent is extended or adjusted under 35 U.S.C. 154(b) by 180 days.

(21) Appl. No.: 15/948,967

(22) Filed: Apr. 9, 2018

Related U.S. Application Data

(60) Provisional application No. 62/483,502, filed on Apr. 10, 2017.

(51) Int. Cl.
  *B25B 27/20* (2006.01)
  *B23P 19/08* (2006.01)

(52) U.S. Cl.
  CPC ............ *B25B 27/20* (2013.01); *B23P 19/084* (2013.01)

(58) Field of Classification Search
  CPC .. B25B 27/146; B25B 27/20; Y10T 29/53783
  See application file for complete search history.

(56) References Cited

U.S. PATENT DOCUMENTS

| | | | | |
|---|---|---|---|---|
| 2,357,139 A | * | 8/1944 | Seme ...................... | B25B 27/20 29/229 |
| 2,961,755 A | * | 11/1960 | Prince ..................... | B25B 27/28 29/235 |
| 3,030,677 A | * | 4/1962 | Kindt ...................... | B22C 21/10 164/385 |
| 3,604,738 A | * | 9/1971 | Alpaugh ................. | F16B 21/18 403/353 |
| 3,995,360 A | * | 12/1976 | Millheiser ............... | B25B 27/20 29/229 |
| 4,501,054 A | * | 2/1985 | Morgan .................. | B25B 27/14 29/229 |

(Continued)

FOREIGN PATENT DOCUMENTS

| | | | | |
|---|---|---|---|---|
| GB | 584290 A | * | 1/1947 | ............. B25B 27/20 |

OTHER PUBLICATIONS

"M14 NM Hood Rebuild Kits", Shooting Sight Website, Web page <https://shootingsight.com/product/m14-nm-hood-rebuild-kits/>, 5 pages, dated at least as early as Nov. 2016, retrieved from www.shootingsight.com website on Dec. 6, 2019.

*Primary Examiner* — Tyrone V Hall, Jr.
(74) *Attorney, Agent, or Firm* — The Law Office of Patrick F. O'Reilly III, LLC

(57) ABSTRACT

A pin tool member and clip installation system including the same is disclosed herein. The pin tool member and the clip installation system are configured to facilitate the installation of a clip member on a shaft. The pin tool member includes a body portion with a tapered section and a cylindrical section, the cylindrical section being attached to the tapered section at a largest diameter portion of the tapered section, the cylindrical section having a substantially constant diameter that is generally equal to the diameter of the pin tool member at the largest diameter portion of the tapered section; and a shaft engagement portion attached to the body portion of the pin tool member, the shaft engagement portion configured to substantially align a longitudinal axis of the body portion with a central axis of a shaft. The clip installation system includes the pin tool member and a tubular pusher member.

7 Claims, 6 Drawing Sheets

(56) References Cited

U.S. PATENT DOCUMENTS

| | | | | |
|---|---|---|---|---|
| 6,722,011 B1* | 4/2004 | Bacon | ............... | B23P 19/084 29/222 |
| 2004/0064928 A1* | 4/2004 | Norwood | ............ | B25B 27/143 29/222 |
| 2004/0093728 A1* | 5/2004 | Hendricks | ............ | B25B 27/12 29/888.042 |
| 2005/0132552 A1* | 6/2005 | Greenhill | ............ | B25B 27/0028 29/229 |
| 2009/0000096 A1* | 1/2009 | Blok | ............ | B25B 27/20 29/270 |
| 2010/0050417 A1* | 3/2010 | Stomski | ............ | B25B 27/20 29/525 |
| 2015/0266175 A1* | 9/2015 | Billett | ............ | B25B 27/20 29/426.2 |

* cited by examiner

PIN TOOL MEMBER AND CLIP INSTALLATION SYSTEM INCLUDING THE SAME

CROSS-REFERENCE TO RELATED APPLICATIONS

This patent application claims priority to, and incorporates by reference in its entirety, U.S. Provisional Patent Application No. 62/483,502, entitled "Pin Tool Member And Clip Installation System Including The Same", filed on Apr. 10, 2017.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a tool to facilitate the installation of an external C-clip or E-clip on a shaft, particularly on a hollow shaft. More particularly, the invention relates to a novel design for a pin tool member and a pusher tube for facilitating the installation of an external C-clip or E-clip on a shaft.

2. Background and Description of Related Art

C-clips, E-clips, and spiral clips, also generally referred to as external retaining rings, are crescent-shaped spring clips that are placed around the outside diameter of a shaft or tube, usually such that they snap into a groove cut in the shaft perimeter. In this manner, the clips prevent axial movement of the shaft in an opening, or prevent the axial movement of objects placed on the shaft. The clips are designed so the crescent subtends more than 180 degrees of the shaft, and are installed by expanding the clip to allow it to snap over the shaft in a radial direction, or to slide over the end of the shaft in an axial direction, and then rely on the spring-back of the ring to contract and lock itself in place. Obviously, there is a need to avoid over-expanding the clip on installation, lest it deform the clip beyond its elastic deformation limit, preventing it from snapping back securely.

Several tools exist to aid in the installation of these clips. The most common are spring clip pliers, similar to needle nose pliers, but with tips which do not taper. C-Clips are often designed with external lobes which have holes in them, exactly so the tips of spring clip pliers can be inserted. As the pliers are squeezed, the tips spread, opening up the clip so as to allow insertion or removal. Field expedient solutions also exist, using needle nose pliers, dental picks, small screwdrivers, etc. There are also various sorts of tweezers that hold a clip, so it can be pushed against the shaft in a radial direction during installation, using the curvature of the shaft to force the clip open.

None of these tools is particularly satisfactory. The tips of the pliers that engage in the small holes in the clip lobes have a very small contact area, and the clip itself has a huge leverage advantage, so if the clip is bumped during installation it is easy for it to twist and pop off the plier tip. Due to the spring force stored in the clip at the moment it is dislodged, the clip will often shoot off the pliers and can get lost. Further, the pliers are bulky, so if the recipient shaft is inside a well, or has other obstructions around it, the pliers cannot easily reach into the confined area. The tweezers solution suffers from the fact that it can only apply clips in the radial direction, but not in the axial direction.

Therefore, what is needed is a pin tool member for facilitating the installation of a clip on a shaft that is able to function properly without requiring the pin tool member to be machined with extreme precision. Moreover, a clip installation system, which includes a pin tool member and a pusher tube, is needed that is able to be effectively utilized for installing clips in confined spaces. Furthermore, there is a need for a pin tool member for facilitating the installation of a clip on a shaft that is able to be flexibly formed using a variety of different lengths tailored to specific applications.

BRIEF SUMMARY OF EMBODIMENTS OF THE INVENTION

Accordingly, the present invention is directed to a pin tool member and clip installation system including the same that substantially obviates one or more problems resulting from the limitations and deficiencies of the related art.

In accordance with one or more embodiments of the present invention, there is provided a pin tool member configured to facilitate the installation of a clip member on a shaft. The pin tool member includes a body portion with a tapered section and a cylindrical section, the tapered section having an outwardly tapered sidewall that extends from a smallest diameter end of the pin tool member to an oppositely disposed largest diameter portion of the tapered section, the cylindrical section being attached to the tapered section at the largest diameter portion of the tapered section, the cylindrical section having a substantially constant diameter that is generally equal to the diameter of the pin tool member at the largest diameter portion of the tapered section; and a shaft engagement portion attached to the body portion of the pin tool member, the shaft engagement portion configured to substantially align a longitudinal axis of the body portion with a central axis of a shaft, the shaft having an outer diameter that is larger than an initial inside diameter of a clip member. The clip member is configured to be expanded radially outward in an elastically deformable manner when slid along the tapered section of the body portion of the pin tool member so that the clip member is capable of being more easily slid onto the shaft.

In a further embodiment of the present invention, the shaft engagement portion comprises a cylindrical body portion and the shaft comprises a tubular body portion with an inside diameter, and wherein an outer diameter of the cylindrical body portion is slightly less than the inside diameter of the shaft so as to allow the cylindrical body portion to be received within a central cavity of the tubular body portion of the shaft, thereby removably coupling the pin tool member to the shaft.

In yet a further embodiment, the cylindrical body portion of the shaft engagement portion is removably attached to the body portion of the pin tool member.

In still a further embodiment, the shaft engagement portion further comprises a threaded section connected to the cylindrical body portion, the threaded section of the shaft engagement portion comprising a plurality of external threads that are configured to threadingly engage with a plurality of corresponding internal threads disposed in a bore at an outer end of the cylindrical section of the pin tool member so as to removably attach the shaft engagement portion to the body portion of the pin tool member.

In yet a further embodiment, the body portion of the pin tool member further comprises an additional cylindrical section attached to the smallest diameter end of the tapered section of the pin tool member, the additional cylindrical section having a substantially constant diameter that is generally equal to the diameter of the pin tool member at the smallest diameter end of the tapered section.

In accordance with one or more other embodiments of the present invention, there is provided a clip installation system configured to facilitate the installation of a clip member on a shaft. The clip installation system includes a pin tool member and a tubular pusher member or pusher tube. The pin tool member includes a pin body portion comprising a tapered section, the tapered section having an outwardly tapered sidewall that extends from a smallest diameter end of the pin tool member to an oppositely disposed largest diameter end of the tapered section; and a shaft engagement portion attached to the pin body portion of the pin tool member, the shaft engagement portion configured to substantially align a longitudinal axis of the pin body portion with a central axis of a shaft, the shaft having an outer diameter that is larger than an initial inside diameter of a clip member. The tubular pusher member includes a tubular body portion having a central cavity with a diameter that is slightly larger than a diameter of the largest diameter end of the tapered section of the pin body portion so as to enable the pin body portion to be received within the central cavity of tubular body portion of the tubular pusher member, the tubular body portion having a length that is greater than an overall length of the pin body portion of the pin tool member, and the tubular body portion having one open end for receiving the pin body portion and one oppositely disposed closed end. The clip member is configured to be expanded radially outward in an elastically deformable manner when the clip member is pushed along the tapered section of the body portion of the pin tool member by the tubular pusher member, thereby enabling the clip member to be more easily slid onto the shaft.

In a further embodiment of the present invention, the pin body portion of the pin tool member further comprises a first cylindrical section, the first cylindrical section being attached to the tapered section at the largest diameter end of the tapered section, the first cylindrical section having a substantially constant diameter that is generally equal to the diameter of the pin tool member at the largest diameter end of the tapered section.

In yet a further embodiment, the pin body portion of the pin tool member further comprises a second cylindrical section attached to the smallest diameter end of the tapered section of the pin tool member, the second cylindrical section having a substantially constant diameter that is generally equal to the diameter of the pin tool member at the smallest diameter end of the tapered section.

In still a further embodiment, the shaft engagement portion of the pin tool member comprises a cylindrical body portion and the shaft comprises a tubular body portion with an inside diameter, and wherein an outer diameter of the cylindrical body portion of the shaft engagement portion is slightly less than the inside diameter of the shaft so as to allow the cylindrical body portion of the shaft engagement portion to be received within a central cavity of the tubular body portion of the shaft, thereby removably coupling the pin tool member to the shaft.

In yet a further embodiment, the cylindrical body portion of the shaft engagement portion of the pin tool member is removably attached to the pin body portion of the pin tool member.

In still a further embodiment, the shaft engagement portion of the pin tool member further comprises a threaded section connected to the cylindrical body portion of the shaft engagement portion, the threaded section of the shaft engagement portion comprising a plurality of external threads that are configured to threadingly engage with a plurality of corresponding internal threads disposed in a bore at an outer end of the first cylindrical section of the pin tool member so as to removably attach the shaft engagement portion to the pin body portion of the pin tool member.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
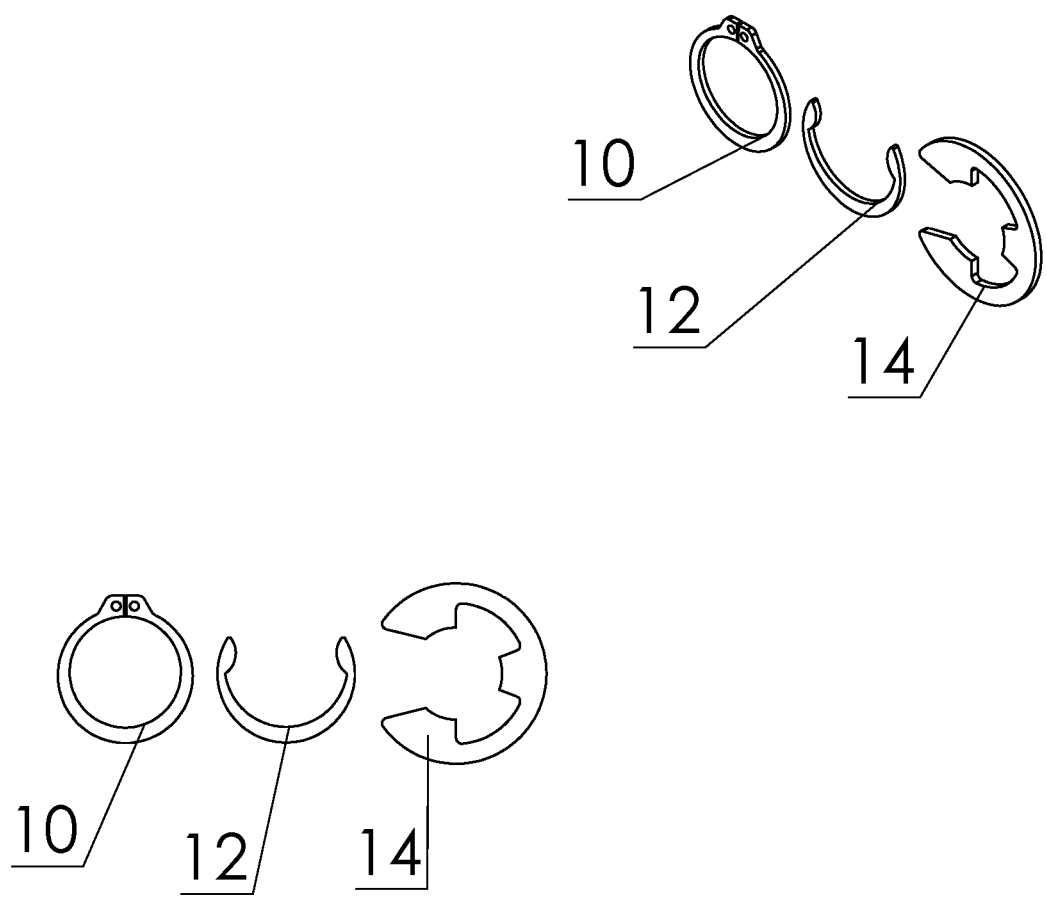
FIG. 1 illustrates a selection of different styles of C-clips and E-clips.

The embodiments described hereinafter illustrate a clip installation system that facilitates the installation of C-clips, E-clips, spiral clips, or other similar clips, on a shaft. These clips are also generally referred to as external retaining rings. In FIG. 1, several exemplary styles of C-clips 10, 12 and an exemplary style of an E-clip 14 are shown. The clip installation system described herein generally comprises a pin tool member (38 or 39 or 69) and pusher tube (5 or 60). These system components will be described in detail hereinafter.

Figure 2A:
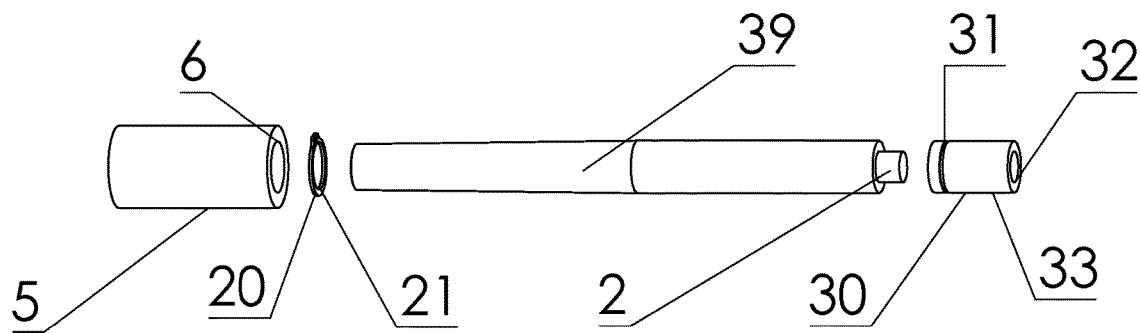
FIG. 2A illustrates a pin tool member aligned with a recipient shaft, a C-clip, and a first exemplary pusher tube, according to one embodiment of the invention.
Figure 3A:
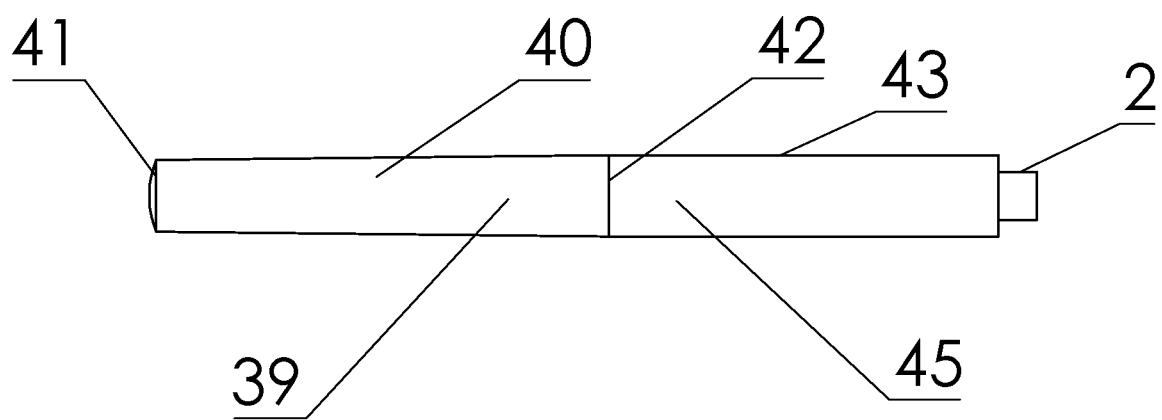
FIG. 3A illustrates the details of the pin tool member depicted in FIGS. 2A-2C.

FIG. 2A illustrates one embodiment of pin tool member 39 aligned with a recipient shaft 30, a C-clip 20, and a first exemplary pusher tube 5 with central cavity 6. Recipient shaft 30 has a circumferential groove 31, designed to allow C-clip 20 to snap into it. Recipient shaft 30 is shown with an internal diameter 32, and an external diameter 33. Turning to FIG. 3A, it can be seen that the pin tool member 39 has a tapered section 40 with the outer surface thereof being tapered, from its smallest diameter 41, to its largest diameter 42, with smallest diameter 41 being smaller than the inside diameter 21 of the C-clip 20, and the largest diameter 42 being generally equal to the outside diameter 33 of recipient shaft 30. In one exemplary embodiment, the tapered section 40 of the pin tool member 39 may be based on a standard taper of 1:48. Although, other suitable taper ratios also may be used based upon the application and the characteristics of the clip being installed. As shown in FIGS. 2A and 3A, the pin tool member 39 also has a pilot 2, which is used to align the pin tool member 39 by inserting pilot 2 into the inside diameter 32 of recipient shaft 30. By aligning the larger diameter end of the pin tool member 39 with the recipient shaft 30, the C-clip 20 can simply slide from the larger diameter end of the pin tool member 39 onto the end of the recipient shaft 30. Alignment of the pin tool member 39 with the recipient shaft 30 is facilitated by the small cylindrical pilot or shaft engagement portion 2, which may be machined into the larger diameter end of the pin tool member 39, which engages in the hollow of the recipient shaft 30.

Figure 2B:
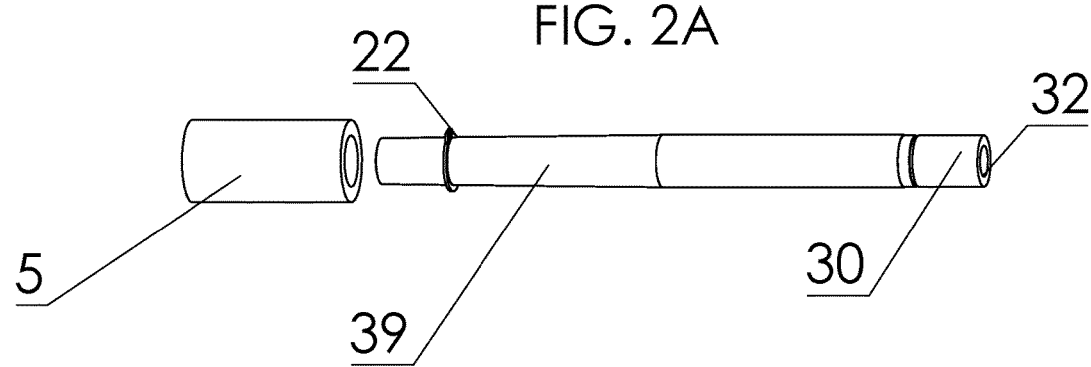
FIG. 2B illustrates the same elements as FIG. 2A, repositioned such that C-clip is placed on the tapered section of the pin tool member in a position ready for installation, and the pilot of the pin tool member is fully inserted into the inside diameter of recipient shaft.

FIG. 2B illustrates the same elements as those depicted in FIG. 2A, repositioned such that C-clip 20 is placed on the tapered section 40 of the pin tool member 39 in a position 22 ready for installation, and the pilot 2 of the pin tool member 39 is fully inserted into the inside diameter 32 of recipient shaft 30.

Figure 2C:
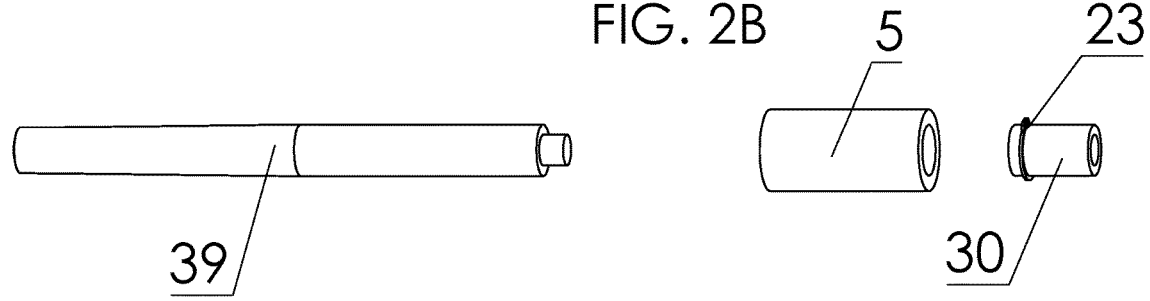
FIG. 2C illustrates the same elements as FIGS. 2A and 2B, except that the C-clip has been pushed forward onto the recipient shaft, such that it has snapped into the groove on the recipient shaft.

FIG. 2C shows the same elements as FIGS. 2A and 2B, except that the C-clip 20 has been pushed fully forward to position 23, such that the C-clip 20 has snapped into the groove 31 on recipient shaft 30.

FIG. 3A illustrates the features of the pin tool member 39 in more detail. As shown in FIG. 3A, the pin tool member 39 includes a tapered section 40, having a smallest diameter 41, and a largest diameter 42. Tapered section 40 is coaxially joined to a cylindrical section 45, at the largest diameter 42 of the tapered section 40, said cylindrical section 45 having diameter 43, such that the diameter 43 is equal to the largest diameter 42 of tapered section 40. The pin tool member 39 of FIG. 3A is illustrated with a monolithic pilot 2.

Figure 3B:
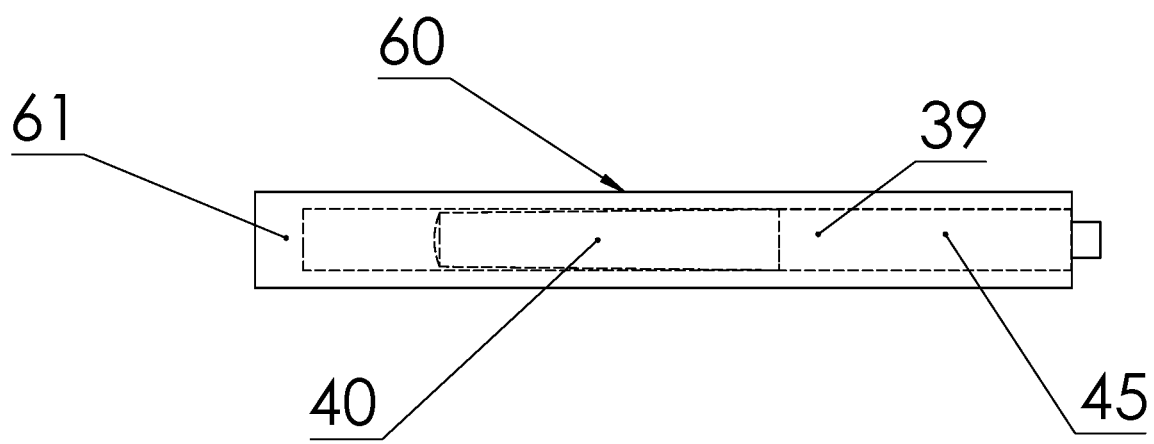
FIG. 3B illustrates the pin tool member of FIG. 3A positioned inside a second exemplary pusher tube.

FIG. 3B illustrates the pin tool member 39 of FIG. 3A positioned inside a second exemplary pusher tube 60. The pusher tube 60 depicted in FIG. 3B has a length that is equal to, or greater than, the combined lengths of the tapered section 40 plus the cylindrical section 45 of the pin tool member 39. FIG. 3B also illustrates an optional element of the pusher tube 60, namely a closed end 61 at one end of the pusher tube 60.

Figure 4:
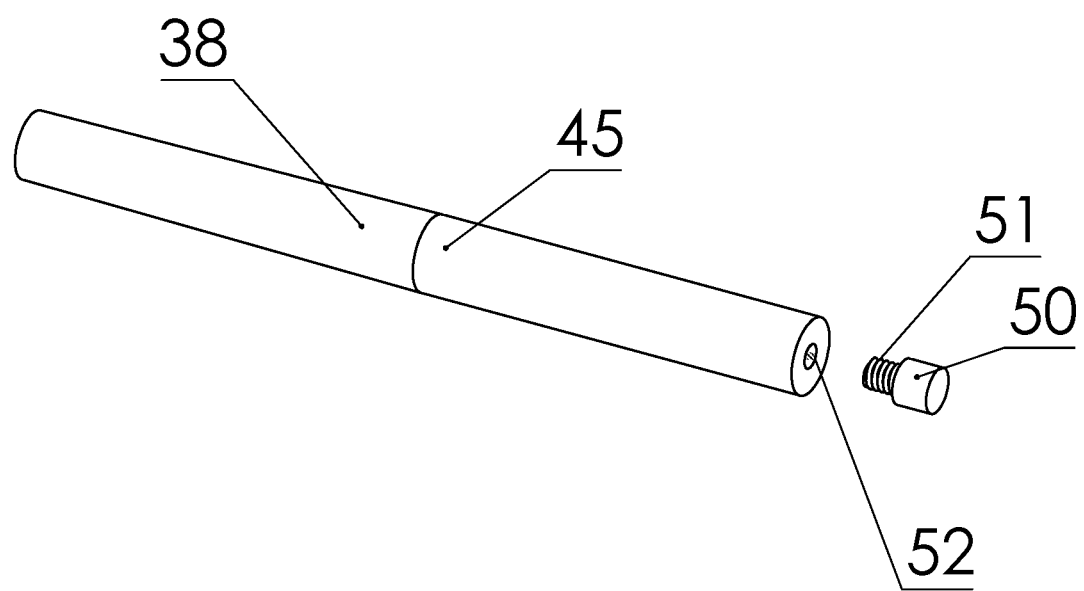
FIG. 4 illustrates another embodiment of the pin tool member, wherein the pin tool member is provided with a removable pilot at the end thereof.

FIG. 4 illustrates an alternative embodiment of a pin tool member 38, wherein the pin tool member 38 is similar in most respects to the pin tool member 39 described above, except that the pin tool member 38 is provided with a removable pilot 50. As shown in FIG. 4, the pin tool member 38 is provided with an internally threaded hole 52 in the largest end thereof. The removable pilot 50 has a corresponding externally threaded section 51, allowing a single pin tool member 38 to be fitted with a plurality of different pilots having various diameters and/or shapes so as to accommodate recipient shafts of various sizes and shapes.

Figure 5:
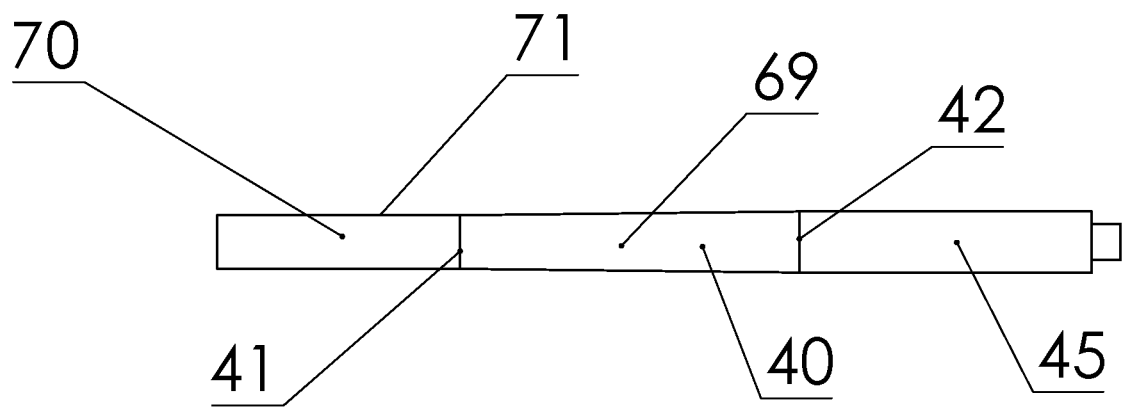
FIG. 5 illustrates yet another embodiment of the pin tool member, wherein the pin tool member is provided with an additional cylindrical section joined to the smallest diameter portion of the tapered section.

FIG. 5 illustrates another alternative embodiment of a pin tool member 69, wherein an additional cylindrical section 70 is added to the pin tool member 69, coaxial with the pin tool member 69, and joined to the smallest diameter 41 of the tapered section 40. In the embodiment of FIG. 5, the diameter 71 of the cylindrical section 70 is smaller than the inside diameter 21 of the C-clip 20. Cylindrical section 70 acts as an extension to pin tool member 69, allowing a longer pin, so that the user can reach into a confined space to insert the C-clip.

Advantageously, the pin tool members 38, 39, 69 described above overcome the shortcomings of the related art by creating an pin tool member 38, 39, 69, which is not simply a tapered pin, but is a coaxial conjoin of a tapered pin 40 with a cylindrical pin 45, with the diameter 43 of the cylindrical section 45 of the pin 38, 39, 69 being equal to the largest diameter 42 of the tapered section 40 of the pin 38, 39, 69. In this manner, errors in machining the length of the pin tool member 38, 39, 69 do not impact the largest diameter of the pin 38, 39, 69, thereby allowing accurate determination of the largest diameter of the pin 38, 39, 69.

In addition, the embodiment of the pin tool member 69 in FIG. 5, further teaches the addition of a cylindrical section 70 on the smallest diameter end of the tapered section 40 of the pin tool member 69, thereby allowing an extended reach of the pin tool.

Also, advantageously, the second embodiment of the pusher tube 60 described above has a greater length than the combined lengths of the entire pin tool member 39. As such, the pusher tube 60 facilitates the installation of C-clips inside restricted spaces. The pusher tube 60 is designed with an inside diameter which is greater than the diameter 43 of the cylindrical section 45 of the pin tool member 39, so it can slide over the entire length of the pin tool member 39, and onto the recipient shaft 30. The pusher tube 60 also has an inside diameter which is smaller than the outside diameter of the C-clip 20, such that sliding the pusher tube 60 over the pin tool member 39 with a C-clip 20 on it, will push the C-clip 20 ahead of the pusher tube 60.

Further, the second embodiment of the pusher tube 60 advantageously has an inside hole that is not a through-hole, but rather is a blind hole, by closing one end 61 of the pusher tube 60. In this manner, the pin tool member 39 remains trapped inside the pusher tube 60, after the C-clip 20 is installed, thereby reducing the likelihood of the pin tool member 39 falling loose after the C-clip 20 has been transferred to the recipient shaft 30. In other embodiments, rather than providing a blind hole in the pusher tube 60, the pusher tube 60 may be provided with a hole that is obstructed in another manner (e.g., the hole may be obstructed by a cross pin passing transversely through the hole).

Also, in one or more further embodiments, the pusher tube 60 may also contain magnets, to help contain a steel version of the pin tool member 39.

In addition, the second embodiment of the pin tool member 38, which is illustrated in FIG. 4, teaches a pin design with a pilot 50 that is not monolithic, but rather is a screw-in insert, thereby allowing the creation of multiple, different combinations of diameters and shapes of the pilot without having to purchase multiple pins.

While not explicitly illustrated in FIGS. 2A-5, in other embodiments of the pin tool member, different geometric shapes may be provided on the tip of the pin tool member 39 in order to align the pin tool 39 with the recipient shaft 30 when the shaft 30 is not hollow. For example, if the recipient shaft 30 were solid, but had a slight convex/concave dome on the end, the pin tool member 39 could have a corresponding concave/convex surface that would nest, helping to centralize the pin tool member 39 with recipient shaft 30. Similarly, if the recipient shaft 30 had chamfered edges, the pin tool member 39 could have a slight recess cut in the tip thereof with a corresponding internal chamfer so that the parts would self-align.

Further, in the third embodiment of FIG. 5, the pin tool member 69 comprises a cylindrical section 70, joined coaxially at the smallest end 41 of the tapered pin section 40, thereby allowing the length of the overall pin to be increased to facilitate reaching into tight spaces. This extension on the smallest end 41 of the pin tool member 69 may be added to the pin tool member 39 of FIG. 3A.

In the illustrated embodiments, the pin tool member 38, 39, 69 is utilized to install external C-clips or E-clips, also referred to as external retaining rings. Pin tool members 38, 39, 69 comprise a tapered section 40, having a smallest diameter 41 and a largest diameter 42. The tapered section 40 is coaxially conjoined to a cylindrical section 45 whose diameter 43 matches the largest diameter 42 of the tapered section 40.

The smallest diameter 41 of the pin tool member 38, 39, 69 is smaller than the inside diameter 21 of the C-clip 20, thus allowing easy insertion of the pin tool member 39 into the C-clip 20.

The diameter 43 of the cylindrical section 45 of pin tool member 39 is generally equal to the outside diameter 33 of recipient shaft 30. The outside diameter of the pilot 2 is a slip-fit into the inside diameter 32 of recipient shaft 30.

Now, with reference primarily to FIGS. 2A-2C and 3A, the functionality of the aforedescribed clip installation system will be described in detail. While the functionality of the system will be explained with reference to the pin tool member 39 and the pusher tube 60, it is to be understood that the explanation is equally applicable to the other embodiments of the pin tool member (i.e., pin tool members 38, 69) and the other embodiment of the pusher tube 5. Initially, to use the tool, a C-clip is placed over the smallest diameter of the tapered section 40 of the pin tool member 39 (see FIG. 2B). The pilot 2 of the pin tool member 39 is placed inside the inside diameter 32 of the recipient shaft 30 to its maximum depth, such that the cylindrical portion 45 of the pin tool member 39 abuts the outside diameter 33 of recipient shaft 30 (as shown in FIG. 2B). Then, the pusher tube 60 is placed over the smallest end of the pin tool member 39, such that the C-clip 20 is between the pusher tube 60, and the recipient shaft 30. By sliding the pusher tube 60 towards the recipient shaft 30, the C-clip 20 will be pushed towards the largest diameter 42 of the tapered section 40 of the pin tool member 39, thereby expanding the inside diameter 21 of the C-clip 20 to match the outside diameter 33 of recipient shaft 30. This sliding action expands the C-clip 20 as it moves along the widening tapered pin section 40, while also keeping the C-clip 20 controlled so it cannot become disengaged. Continuing to push the pusher tube 60 towards the recipient shaft 30 will slide C-clip 20 along the cylindrical section 45 of the pin tool member 39, and will cause C-clip 20 to transfer onto recipient shaft 30, and on to such a position 23 (as shown in FIG. 2C), where the C-clip 20 will snap into the external groove 31 of recipient shaft 30.

Slight modifications to this method can be envisioned without changing its intent, whereby the pusher tube 60 and pin tool member 39 can be modified so that the pin tool member 39 remains trapped in the pusher tube 60 after the C-clip 20 is installed, thereby facilitating recovery of the pin tool member 39 if the C-clip 20 is installed in a difficult-to-reach area. For instance, if the C-clip 20 is being installed in an upward direction, it would suffice to close the bottom of the pusher tube 60, so it has a blind hole with a depth greater than the length of the pin tool member 39 (see FIG. 3B). In this manner, the force of gravity would keep the pin tool member 39 trapped in the pusher tube 60. Alternatively, magnets could be installed in the base of the pusher tube 60, so the pin tool member 39 would be held in place magnetically.

Minor modifications to the pin tool member 39 can also be envisioned by having the tapered section 40 be in the form of a non-conical taper. A taper formed by a concave arc might allow easier manufacturing on a grinder, or a taper with a convex arc would allow the taper to become tangent with the cylindrical section 45 of the pin tool member 39. However, none of these changes alters the function of the tapered section 40 of the pin tool member 39, in that they all expand the inside diameter of the C-clip 20 from its relaxed diameter, to a larger diameter sufficient to be placed on recipient shaft 30.

It is readily apparent that the aforedescribed clip installation system, which includes the pin tool member 38, 39, 69 and the pusher tube 60, offers numerous advantages. First, the pin tool member 38, 39, 69 is able to function properly without requiring the pin tool member 38, 39, 69 to be machined with extreme precision. In particular, because the pin tool member 38, 39, 69 includes the cylindrical section 45 attached to the largest diameter end 42 of the tapered section 40, there is no explicit relationship between the overall length and diameter of the pin tool member 38, 39, 69. Thus, any errors in machining the length of the tapered section 40 of the pin tool member 38, 39, 69 will not result in any errors in the largest diameter 42 of the pin tool member 38, 39, 69. Advantageously, the design of the novel pin tool member 38, 39, 69 prevents errors in the pin diameter that over-expand the C-clip 20, if the error creates a largest diameter that is larger than the recipient shaft 30. The design of the novel pin tool member 38, 39, 69 also prevents errors that result in difficulties with getting the C-clip 20 to slide onto the recipient shaft 30, if the largest diameter of the tapered pin section 40 is smaller than the diameter of the recipient shaft 30. Secondly, the aforedescribed clip installation system, which includes the pin tool member 38, 39, 69 and the pusher tube 60 that is longer in length than the pin tool member 38, 39, 69, is able to be effectively utilized for installing clips in confined spaces. Finally, the pin tool member 38, 39, 69 described herein is able to be flexibly formed using a variety of different lengths tailored to specific applications. Because the pin tool member 38, 39, 69 includes the cylindrical section 45 attached to the largest diameter end 42 of the tapered section 40, the maximum length of the pin tool member 38, 39, 69 is not required to be determined purely by a standard taper of the tapered section 40 (e.g., 1:48) or a maximum diameter desired. Also, the cylindrical extension 70 added to the smaller end of the tapered section 40 of the pin tool member 69 also enables the length of the pin tool member 69 to be desirably extended for installing clips in confined spaces.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A pin tool member configured to facilitate the installation of a clip member on a shaft, said pin tool member comprising:
a body portion with a tapered section and a cylindrical section, the tapered section having an outwardly tapered sidewall that extends from a smallest diameter end of the pin tool member to an oppositely disposed largest diameter portion of the tapered section, the cylindrical section being attached to the tapered section at the largest diameter portion of the tapered section, the cylindrical section having a substantially constant diameter that is generally equal to the diameter of the pin tool member at the largest diameter portion of the tapered section, and the body portion of the pin tool member further comprising an additional cylindrical section attached to the smallest diameter end of the tapered section of the pin tool member, the additional cylindrical section having a substantially constant diameter that is generally equal to the diameter of the pin tool member at the smallest diameter end of the tapered section; and
a shaft engagement portion attached to the body portion of the pin tool member, the shaft engagement portion configured to substantially align a longitudinal axis of the body portion with a central axis of a shaft, the shaft having an outer diameter that is larger than an initial inside diameter of a clip member;
wherein the clip member is configured to be expanded radially outward in an elastically deformable manner when slid along the tapered section of the body portion of the pin tool member so that the clip member is capable of being more easily slid onto the shaft.

2. The pin tool member according to claim 1, wherein the shaft engagement portion comprises a cylindrical body portion and the shaft comprises a tubular body portion with an inside diameter, and wherein an outer diameter of the cylindrical body portion is slightly less than the inside diameter of the shaft so as to allow the cylindrical body portion to be received within a central cavity of the tubular body portion of the shaft, thereby removably coupling the pin tool member to the shaft.

3. The pin tool member according to claim 2, wherein the cylindrical body portion of the shaft engagement portion is removably attached to the body portion of the pin tool member.

4. The pin tool member according to claim 3, wherein the shaft engagement portion further comprises a threaded section connected to the cylindrical body portion, the threaded section of the shaft engagement portion comprising a plurality of external threads that are configured to threadingly engage with a plurality of corresponding internal threads disposed in a bore at an outer end of the cylindrical section of the pin tool member so as to removably attach the shaft engagement portion to the body portion of the pin tool member.

5. A clip installation system configured to facilitate the installation of a clip member on a shaft, said clip installation system comprising:
a pin tool member that includes:
a pin body portion comprising a tapered section, the tapered section having an outwardly tapered sidewall that extends from a smallest diameter end of the pin tool member to an oppositely disposed largest diameter end of the tapered section, the pin body portion of the pin tool member further comprising a first cylindrical section, the first cylindrical section being attached to the tapered section at the largest diameter end of the tapered section, the first cylindrical section having a substantially constant diameter that is generally equal to the diameter of the pin tool member at the largest diameter end of the tapered section; and
a shaft engagement portion attached to the pin body portion of the pin tool member, the shaft engagement portion configured to substantially align a longitudinal axis of the pin body portion with a central axis of a shaft, the shaft having an outer diameter that is larger than an initial inside diameter of a clip member, the shaft engagement portion of the pin tool member comprising a cylindrical body portion and the shaft comprising a tubular body portion with an inside diameter, and wherein an outer diameter of the cylindrical body portion of the shaft engagement portion is slightly less than the inside diameter of the shaft so as to allow the cylindrical body portion of the shaft engagement portion to be received within a central cavity of the tubular body portion of the shaft, thereby removably coupling the pin tool member to the shaft, and the cylindrical body portion of the shaft engagement portion of the pin tool member is removably attached to the pin body portion of the pin tool member; and
a tubular pusher member that includes:
a tubular body portion having a central cavity with a diameter that is slightly larger than a diameter of the largest diameter end of the tapered section of the pin body portion so as to enable the pin body portion to be received within the central cavity of tubular body portion of the tubular pusher member, the tubular body portion having a length that is greater than an overall length of the pin body portion of the pin tool member, and the tubular body portion having one open end for receiving the pin body portion and one oppositely disposed closed end;
wherein the clip member is configured to be expanded radially outward in an elastically deformable manner when the clip member is pushed along the tapered section of the body portion of the pin tool member by the tubular pusher member, thereby enabling the clip member to be more easily slid onto the shaft.

6. The clip installation system according to claim 5, wherein the pin body portion of the pin tool member further comprises a second cylindrical section attached to the smallest diameter end of the tapered section of the pin tool member, the second cylindrical section having a substantially constant diameter that is generally equal to the diameter of the pin tool member at the smallest diameter end of the tapered section.

7. The clip installation system according to claim 5, wherein the shaft engagement portion of the pin tool member further comprises a threaded section connected to the cylindrical body portion of the shaft engagement portion, the threaded section of the shaft engagement portion comprising a plurality of external threads that are configured to threadingly engage with a plurality of corresponding internal threads disposed in a bore at an outer end of the first cylindrical section of the pin tool member so as to removably attach the shaft engagement portion to the pin body portion of the pin tool member.

* * * * *